(12) United States Patent
Dai et al.

(10) Patent No.: US 10,844,275 B2
(45) Date of Patent: Nov. 24, 2020

(54) METHOD FOR OIL DISPLACEMENT USING DISPERSED PARTICLE GEL-STRENGTHENED POLYMER TERNARY COMPOSITE DISPLACEMENT SYSTEM

(71) Applicant: China University of Petroleum (East China), Qingdao (CN)

(72) Inventors: Caili Dai, Qingdao (CN); Guang Zhao, Qingdao (CN); Jiaping Tao, Qingdao (CN); Yifei Liu, Qingdao (CN); Chenglin Gu, Qingdao (CN); Jiaming Li, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 16/751,674

(22) Filed: Jan. 24, 2020

(65) Prior Publication Data
US 2020/0308474 A1 Oct. 1, 2020

(30) Foreign Application Priority Data
Mar. 26, 2019 (CN) .......................... 2019 1 0233911

(51) Int. Cl.
*E21B 43/16* (2006.01)
*C09K 8/588* (2006.01)
*C09K 8/584* (2006.01)

(52) U.S. Cl.
CPC .............. *C09K 8/588* (2013.01); *C09K 8/584* (2013.01); *E21B 43/16* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 3,667,546 A * | 6/1972 | Parker | C09K 8/512 166/270.1 |
| 10,202,540 B2 | 2/2019 | Dai et al. | |
| 10,294,409 B2 | 5/2019 | Zhao et al. | |
| 2007/0204989 A1* | 9/2007 | Tang | C09K 8/508 166/270 |
| 2016/0289540 A1* | 10/2016 | Dai | C09K 8/032 |

FOREIGN PATENT DOCUMENTS

| | | |
|---|---|---|
| CN | 1439689 A | 9/2003 |
| CN | 102690643 A | 9/2012 |
| CN | 103224777 A | 7/2013 |
| CN | 103589414 A | 2/2014 |

* cited by examiner

*Primary Examiner* — Andrew Sue-Ako
(74) *Attorney, Agent, or Firm* — Volpe Koenig

(57) ABSTRACT

The present disclosure relates to a method for oil displacement using a dispersed particle gel-strengthened polymer ternary composite displacement system.

18 Claims, 2 Drawing Sheets

METHOD FOR OIL DISPLACEMENT USING DISPERSED PARTICLE GEL-STRENGTHENED POLYMER TERNARY COMPOSITE DISPLACEMENT SYSTEM

PRIORITY CLAIM & CROSS REFERENCE

This application claims priority to Chinese Application No. 2019102333911.1, filed on Mar. 26, 2019, entitled "Dispersed particle gel-strengthened polymer ternary composite displacement system and use thereof", which is specifically and entirely incorporated by reference.

FIELD

The present disclosure relates to the field of oilfield chemistry, in particular to a method for oil displacement using a dispersed particle gel-strengthened polymer ternary composite displacement system.

BACKGROUND

The oil and gas fields developed or explored in China are mainly continental facies sedimentary oil fields, and the reservoir permeability difference is large and the heterogeneity is strong. With the development of the oil field, the water flooding water content is increased and the water flooding efficiency is low. In the later stage of water flooding oil production, 60%-70% of original petroleum is still stored in an oil layer. Therefore, how to improve the recovery efficiency of the residual oil is the key for increasing and stabilizing the yield of the high-water-cut oil field. In recent years, chemical composite displacement technologies mainly including polymer/surfactant binary composite displacement and polymer/surfactant/alkali ternary composite displacement have been developed and have been successful in field experiments. Wherein, the chemical composite displacement technology mainly based on polymer ternary composite displacement is widely applied on site.

The polymer in the polymer ternary composite displacement system mainly has the functions of increasing the viscosity of the displacement fluid to enlarge swept volume and reducing the diffusion speed of the surfactant and the alkali. The surfactant can reduce the interfacial tension between the polymer solution and the crude oil, emulsify the oil and improve the viscosity of the displacement agent. The addition of alkali in the ternary composite displacement system further strengthens the displacement effect. The added alkali can react with petroleum acid to generate a surfactant, which cooperates with the surfactant added in the composite displacement system to improve the oil displacement efficiency of the composite displacement system. In addition, the addition of the alkali can also form emulsified crude oil, improve the viscosity of the displacement medium and further strengthen the mobility regulation and control capability of the polymer.

However, the polymer ternary composite displacement technology also exposes some problems in the field implementation process, and the polymer in the polymer ternary composite displacement system is greatly influenced by the shearing of injection equipment, the shearing of formation porous media and the physical and chemical properties of formation, so that the viscosity of the polymer is greatly reduced, and the mobility control is weakened. In particular, in the subsequent water flooding stage, the injection pressure is reduced quickly, and the displacement agent is easy to flow and output from oil well, so that the effect of improving the recovery efficiency of the displacement agent is greatly limited, the use value of the displacement agent is reduced, and the long-term effective development effect is difficult to obtain.

SUMMARY

The present disclosure aims to provide a method for oil displacement, which adopts a dispersed particle gel-strengthened polymer ternary composite displacement system, can improve the polymer mobility control capability in the dispersed particle gel-strengthened polymer ternary composite displacement system, and solves the problem of rapid injection pressure drop in the subsequent water flooding stage, thereby effectively improving the water flooding recovery efficiency.

In order to achieve the above object, the present disclosure provides a method for oil displacement, comprising: through the water well of an oil field, (1) injecting a pre-treatment slug into the formation, wherein the pre-treatment slug adopts a first surfactant;

(2) injecting a main slug into the formation, wherein the main slug adopts a dispersed particle gel-strengthened polymer ternary composite displacement system;

(3) injecting a protective slug into the formation, wherein the protective slug adopts a first dispersed particle gel;

(4) injecting an over-propelling fluid into the formation;

wherein the dispersed particle gel-strengthened polymer ternary composite displacement system contains: a second dispersed particle gel, a displacement polymer, an alkaline compound, and a second surfactant:

wherein the displacement polymer is a first partially hydrolyzed polyacrylamide with weight-average molecular weight of more than 10,000,000 g/mol.

By adopting the method for oil displacement provided by the present disclosure, the mobility control capability of the dispersed particle gel-strengthened polymer ternary composite displacement system can be enhanced by means of the synergistic effect of the second dispersed particle gel and the displacement polymer, the injection pressure of the subsequent water flooding stage of the composite displacement system is improved, the sweep efficiency and the oil displacement efficiency of the displacement system are further improved, and the oil recovery of the dispersed particle gel-strengthened polymer ternary composite displacement system is improved to the maximum extent.

A BRIEF DESCRIPTION OF THE DRAWINGS

DETAILED DESCRIPTION

Figure 1:
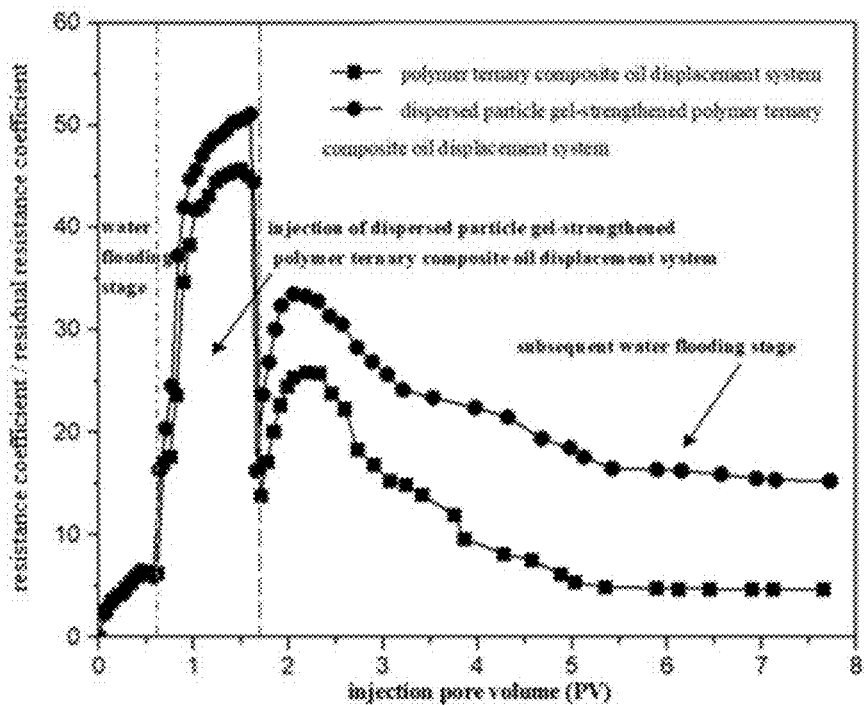
FIG. 1 is a comparative curve of the subsequent mobility control of the dispersed particle gel-strengthened polymer ternary composite displacement system in example 1 and comparative example 1.

The endpoints and any value in the ranges disclosed in the present disclosure are not limited to the exact ranges or values; instead, those ranges or values shall be comprehended as encompassing values that are close to those ranges or values. For numerical ranges, each range between its endpoints and individual point values, and each individual point value can be combined with each other to obtain one or more new numerical ranges, and such numerical ranges should be deemed as having been disclosed specifically herein.

It should be noted that the foregoing "first", "second", etc. are only used for distinguishing different chemical substances involved in the present disclosure, and do not indicate any sequence, and those skilled in the art should not be construed as limiting the present disclosure.

The present disclosure provides a method for oil displacement, comprising: through the water well of an oil field, (1) injecting a pre-treatment slug into the formation, wherein the pre-treatment slug adopts a first surfactant;

(2) injecting a main slug into the formation, wherein the main slug adopts a dispersed particle gel-strengthened polymer ternary composite displacement system;

(3) injecting a protective slug into the formation, wherein the protective slug adopts a first dispersed particle gel;

(4) injecting an over-propelling fluid into the formation;

wherein the dispersed particle gel-strengthened polymer ternary composite displacement system contains: a second dispersed particle gel, a displacement polymer, an alkaline compound, and a second surfactant;

wherein the displacement polymer is a first partially hydrolyzed polyacrylamide with weight-average molecular weight of more than 10,000,000 g/mol.

Wherein the pre-treatment slug is a first surfactant, can drive out the residual oil in the formation, and facilitate smooth injection of subsequent working fluid. The first surfactant is preferably provided in the form of an aqueous solution thereof, for example, an aqueous surfactant solution having a concentration of 0.1 to 0.5 wt % is used. Preferably, the volume injection amount of the pre-treatment slug is 1 to 5% of the pore volume of the formation.

The adopted main slug is a dispersed particle gel-strengthened polymer ternary composite displacement system strengthened by the second dispersed particle gel, which is favorable for improving swept volume and oil displacement efficiency of the composite displacement system, so that the recovery efficiency is greatly increased. Preferably, the volume injection amount of the main slug is 65 to 88% of the pore volume of the formation.

Wherein, the dispersed particle gel-strengthened polymer ternary composite displacement system contains: a second dispersed particle gel, a displacement polymer, an alkaline compound, and a second surfactant; wherein the displacement polymer is a first partially hydrolyzed polyacrylamide with weight-average molecular weight of more than 10,000,000 g/mol.

The adopted protective slug is a first dispersed particle gel, and can form a protective barrier for the second dispersed particle gel-strengthened polymer ternary composite displacement system injected into a formation, avoid viscosity too fast loss and improve the injection pressure of subsequent fluid. The first dispersed particle gel is preferably provided in the form of an aqueous dispersion thereof, for example an aqueous dispersion of the first dispersed particle gel having a concentration of from 0.1 to 0.5 wt % is employed. Preferably, the volume injection amount of the protective slug is 10 to 25% of the pore volume of the formation.

In an embodiment provided by the present disclosure, the first dispersed particle gel and the second dispersed particle gel are the same or different, preferably the same.

In the embodiment provided by the present disclosure, the adopted over-propelling fluid is clear water or treated oil field reinjection sewage, which can push the displacement agent away from the wellbore, so that the wellbore pollution is avoided. Preferably, the volume injection amount of the over-propelling fluid is 1 to 5% of the pore volume of the formation.

In embodiments provided herein, the first surfactant and the second surfactant are the same or different. In order to enable the first surfactant and the second surfactant to be better used with the present displacement system component, preferably, the first surfactant and the second surfactant are one or more of alkylbenzene sulfonates, alkyl sulfonates, petroleum sulfonates, and petroleum carboxylates, respectively, and more preferably alkylbenzene sulfonates.

Specific examples of the alkylbenzene sulfonate may be, for example: sodium heavy alkylbenzene sulfonate and potassium heavy alkylbenzene sulfonate.

Specific examples of the alkyl sulfonates may be, for example: sodium dodecyl sulfonate, sodium tetradecyl sulfonate, sodium hexadecyl sulfonate, sodium octadecyl sulfonate, and sodium secondary alkyl sulfonate.

Specific examples of the petroleum sulfonate may be, for example: sodium petroleum sulfonate and potassium petroleum sulfonate.

Specific examples of the petroleum carboxylate may be, for example: sodium petroleum carboxylate and potassium petroleum carboxylate.

According to the present disclosure, in order to facilitate the subsequent water flooding to be performed more smoothly, preferably, the method further comprises: after the steps (1) to (4) are completed, closing the water well and oil well of the oil field for 3 to 5 days, and then opening the water well and oil well to recover the production. The oil displacement can be continuously implemented by water after the well is opened.

The water well and oil well are well-known in the field of the oil field. Slugs of the present disclosure are injected through the water well, oils recovered are flowed from the oil well.

According to the present disclosure, under the cooperative use of all the components in the dispersed particle gel-strengthened polymer ternary composite displacement system, the injection pressure in the subsequent water flooding stage can be obviously improved, thereby being beneficial to the improvement of the crude oil recovery efficiency in the subsequent water flooding stage. Wherein, the content of each component in the dispersed particle gel-strengthened polymer ternary composite displacement system can be varied within a wide range. In order to the components in the dispersed particle gel-strengthened polymer ternary composite displacement system cooperate better, preferably, the content of the second dispersed particle gel is 0.2 to 8 wt %, the content of the displacement polymer is 0.1 to 2 wt %, the content of the alkaline compound is 0.1 to 5 wt %, and the content of the second surfactant is 0.1 to 1.5 wt %, based on the total weight of the dispersed particle gel-strengthened polymer ternary composite displacement system. More preferably, the content of the second dispersed particle gel is 1 to 5 wt %, the content of the displacement polymer is 0.1 to 1 wt %, the content of the alkaline compound is 0.3 to 2 wt %, and the content of the second surfactant is 0.2 to 1 wt %, based on the total weight of the dispersed particle gel-strengthened polymer ternary composite displacement system. Still more preferably, the content of the second dispersed particle gel is 1 to 3 wt %, the content of the displacement polymer is 0.2 to 0.3 wt %, the content of the alkaline compound is 0.5 to 1.2 wt %, and the content of the second surfactant is 0.2 to 0.4 wt %, based on the total weight of the dispersed particle gel-strengthened polymer ternary composite displacement system.

Wherein the dispersed particle gel-strengthened polymer ternary composite displacement system can obtain the effect of improving the recovery efficiency of crude oil required by the present disclosure by only using the displacement system containing the second dispersed particle gel, the displacement polymer, the alkaline compound and the second surfactant as effective ingredients, although the dispersed particle gel-strengthened polymer ternary composite displacement system can also contain other ingredients which do not have negative influence on the synergistic effect of the active ingredients in the displacement system. It should be understood that the dispersed particle gel-strengthened polymer ternary composite displacement system is primarily a water flooding system, which may also contain water, the content of the water may be in an amount of 80 to 99.5 wt %, preferably 91 to 98.6 wt %, more preferably 96.1 to 98.1 wt %. For a dispersed particle gel-strengthened polymer ternary composite displacement system, the balance may be considered water.

According to the present disclosure, the second dispersed particle gel and the displacement polymer contained in the dispersed particle gel-strengthened polymer ternary composite displacement system have excellent synergistic effect, and the mobility control capability of the displacement system can be improved under the cooperative use of both, the injection pressure of the composite displacement system in the subsequent water flooding stage is improved, and the higher crude oil recovery efficiency is obtained. Wherein, in order to obtain better cooperative effect of the displacement polymer and other components of the dispersed particle gel-strengthened polymer ternary composite displacement system, especially better synergistic effect with the second dispersed particle gel.

Preferably, the displacement polymer is a first partially hydrolyzed polyacrylamide with weight-average molecular weight of more than 10,000,000 g/mol. Preferably, the weight-average molecular weight of the first partially hydrolyzed polyacrylamide is 10,000,000 to 25,000,000 g/mol, preferably 10,000,000 to 20,000,000 g/mol, further preferably 12,000,000 to 19,000,000 g/mol, further preferably 14,000,000 to 18,000,000 g/mol, and more preferably 15,000,000 to 17,000,000 g/mol. The degree of hydrolysis of the first partially hydrolyzed polyacrylamide can be properly selected within a wide range, and preferably, the degree of hydrolysis of the first partially hydrolyzed polyacrylamide is 14 to 24%, and the degree of hydrolysis refers to the mole percentage of the hydrolyzed structural units in the polyacrylamide to all structural units of the polyacrylamide.

According to the present disclosure, although the mobility control of the resulting displacement system is improved by the cooperation of the second dispersed particle gel with the ternary composite displacement system, in order to enable better cooperation of the second dispersed particle gel with the other components of the dispersed particle gel-strengthened polymer ternary composite displacement system, in particular with the specific first partially hydrolyzed polyacrylamide of the present disclosure, preferably the first dispersed particle gel and the second dispersed particle gel are the same or different and are each prepared from a composition for dispersed particle gel comprising a polymeric matrix, a resin cross-linking agent, a coagulant and nanographite, wherein:

with respect to 100 parts by weight of the polymeric matrix, the content of the resin cross-linking agent is 30 to 150 parts by weight, the content of the coagulant is 5 to 100 parts by weight, and the content of the nano-graphite emulsion is 3 to 30 parts by weight;

wherein the polymeric matrix is the second partially hydrolyzed polyacrylamide with weight-average molecular weight within a range of 5,000,000 to 8,000,000 g/mol:

the coagulant is one or more of chlorine salt coagulant and alcohol amine coagulant.

According to the present disclosure, though a bulk gel system and a first dispersed particle gel or a second dispersed particle gel with excellent performance can be obtained simply by using the polymeric matrix, resin cross-linking agent, coagulant, and nano-graphite emulsion at the above-mentioned weight ratio, preferably, in order to obtain a bulk gel system and a first dispersed particle gel or a second dispersed particle gel with better performance, with respect to 100 parts by weight of the polymeric matrix, the content of the resin cross-linking agent is 50 to 130 parts by weight, the content of the coagulant is 8 to 90 parts by weight, and the content of the nano-graphite emulsion is 4 to 20 parts by weight.

More preferably, with respect to 100 parts by weight of the polymeric matrix, the content of the resin cross-linking agent is 50 to 100 parts by weight, the content of the coagulant is 8 to 50 parts by weight, and the content of the nano-graphite emulsion is 4 to 18 parts by weight.

In a preferred embodiment of the present disclosure, with respect to 100 parts by weight of the polymeric matrix, the content of the resin cross-linking agent is 120 to 130 parts by weight, the content of the coagulant is 12 to 18 parts by weight, and the content of the nano-graphite emulsion is 10 to 18 parts by weight.

According to the present disclosure, the weight-average molecular weight of the polymeric matrix used in the present disclosure should be with a range of 5,000,000 to 8,000,000 g/mol. If the weight-average molecular weight of the polymeric matrix is less than 5,000,000 g/mol, the gelation time for forming the bulk gel will be long (more than or equal to 12 hours), and the gel strength will be weak (less than or equal to 30 KPa); if the weight-average molecular weight of the polymeric matrix is more than 8,000,000 g/mol, the viscosity of the polymer solution will be too high, and consequently the added nano-graphite emulsion can't be dispersed, in this case, however, the bulk gel can't be formed if the polymer concentration is very low in the preparation. Preferably, the weight-average molecular weight of the polymeric matrix is 6,000,000 to 8,000,000 g/mol.

Though the polymeric matrix is a second partially hydrolyzed polyacrylamide, which is a non-ionic polymer, of which the degree of hydrolysis preferably is 3 to 10%, and more preferably is 3 to 6%. Herein, the degree of hydrolysis refers to the molar percentage of hydrolyzed structural units in the polyacrylamide to all structural units of the polyacrylamide.

According to the present disclosure, preferably, the resin cross-linking agent is phenolic resin prepolymer. The resin cross-linking agent used in the present disclosure usually is a commercially available product, and its effective content may be 40 to 60 wt %, i.e., the content of the components excluding the solvent is 40 to 60 wt %. The content of the resin cross-linking agent described in the present disclosure is measured in effective quantity.

According to the present disclosure, the chloride salt coagulant may be selected from a variety of chloride salt coagulants, preferably is one or more of sodium chloride, potassium chloride, and calcium chloride; the alcohol amine coagulant may be selected from a variety of alcohol amine coagulants, preferably is one or more of tri-ethanolamine, tri-iso-propanolamine, and tri-iso-butanolamine. Wherein, the alcohol amine coagulant (especially tri-ethanolamine) may have a more outstanding effect of shortening the gelation time. To that end, in the case that an alcohol amine coagulant (especially tri-ethanolamine) is used as the coagulant, a high-strength bulk gel system can be obtained with less coagulant. Therefore, in an embodiment of the present disclosure, if an alcohol amine coagulant (especially tri-ethanolamine) is used as the coagulant, the content of the coagulant is 8 to 20 parts by weight with respect to 100 parts by weight of the polymeric matrix.

If a chloride salt coagulant (especially sodium chloride) is used, the coagulant has to be dosed in a greater amount. Preferably, in the case that a chloride salt coagulant is used, the content of the coagulant is 22 to 100 parts by weight, and preferably is 25 to 85 parts by weight, with respect to 100 parts by weight of the polymeric matrix.

According to the present disclosure, the size of nano-graphite in the nano-graphite emulsion may be varied within a wide range. Preferably, the particle size of nano-graphite in the nano-graphite emulsion is 50 to 100 nm. Preferably, in the nano-graphite emulsion, the content of nano-graphite is 30 to 70 wt %, and more preferably is 40 to 60 wt %.

According to the present disclosure, all components of the composition may be obtained in conventional ways in the art. For example, they may be prepared with conventional methods in the art, or may be commercial products.

According to the present disclosure, the bulk gel system required in the present disclosure can be obtained by gelatinizing the composition described above in the present disclosure together with water. Thus, the above-mentioned composition in the present disclosure preferably consists of a polymeric matrix, a resin cross-linking agent, a coagulant, and nano-graphite emulsion only.

According to the present disclosure, preferably, the process of preparing a first dispersed particle gel or a second dispersed particle gel comprises:

(1) providing a gelling fluid that contains the composition for the dispersed particle gel and water, and then aging for gelation to obtain a bulk gel system;

(2) shearing the resulting bulk gel system together with water to obtain the first dispersed particle gel or the second dispersed particle gel.

According to the present disclosure, in the preparation of the gelling fluid, the dosage of water may be varied within a wide range. To facilitate quick gelation, preferably the water is used in an amount that ensures the content of the polymeric matrix is 0.4 to 2 wt % in the resulting bulk gel system, and more preferably is 0.6 to 1.2 wt %.

According to the present disclosure, the preparation process of the above-mentioned gelling fluid preferably comprises: first, mixing water and the polymeric matrix (the mixing time may be 30 to 60 min); then, introducing the resin cross-linking agent and mixing (the mixing time may be 5 to 10 min); next, introducing the coagulant and mixing (the mixing time may be 5 to 10 min); finally, introducing the nano-graphite emulsion and mixing (the mixing time may be 5 to 10 min).

According to the present disclosure, preferably, the conditions of the aging for gelation include: a temperature of 85 to 95° C., a gelation time of 3 to 6 h (e.g., 3 to 4 h).

Thus, a high-strength bulk gel system can be obtained within 3 to 6 h at 85 to 95° C.

According to the present disclosure, the bulk gel system of the present disclosure is a massive block of gel with certain strength, which is formed by cross-linking among the polymer, the cross-linking agent, the coagulant, and the nano-graphite emulsion, and therefore is referred to as a "bulk" gel system.

According to the present disclosure, the dosage of water for shearing to form the first or second dispersed particle gel may be varied within a wide range. Preferably, a weight ratio of the bulk gel system to water is 100:(10 to 40), and preferably is 100:(20 to 30).

According to the present disclosure, preferably, the shearing is carried out in a colloid mill, of which the rotation speed is 1,000 to 3,000 rpm (e.g., 2,500 to 3,000 rpm), the shearing interval is 10 to 170 μm (e.g., 10 to 50 m), and the shearing time is 3 to 15 min (e.g., 5 to 10 min).

According to the present disclosure, the particle size of the dispersed particle gel preferably is 0.5 to 10 μm, preferably 0.6 to 2 μm, for example 1 to 1.5 μm.

According to the present disclosure, the alkaline compound may be properly selected from alkali used for ternary displacement agents. Preferably, the alkaline compound is one or more of sodium hydroxide, potassium hydroxide, sodium carbonate, sodium bicarbonate, potassium carbonate, sodium silicate, and ammonia, preferably one or more of sodium hydroxide, potassium hydroxide, sodium carbonate, and sodium bicarbonate.

According to the present disclosure, the dispersed particle gel-strengthened polymer ternary composite displacement system can be prepared by simply mixing the components contained in the system with water, and in order to promote better contact compatibility among the components, preferably, the preparation process of the dispersed particle gel-strengthened polymer ternary composite displacement system comprises the following steps:

first, mixing the second dispersed particle gel with water (the mixing time may be 5 to 10 min); then, introducing the displacement polymer and mixing (the mixing time may be 30 to 60 min); next, introducing the alkaline compound and mixing (the mixing time may be 5 to 10 min); finally, introducing the second surfactant and mixing (the mixing time may be 5 to 10 min).

The method for oil displacement of the present disclosure adopts a dispersed particle gel-strengthened polymer ternary composite displacement system, which is beneficial to improving the recovery efficiency of oil displacement, and can be adjusted according to the requirements.

The present disclosure can obtain the following advantages:

(1) the method for oil displacement preferably adopted by the present disclosure can effectively improve the displacement effect of the composite displacement system by arranging three oil displacement slugs. The preparation and construction process of the dispersed particle gel-strengthened polymer ternary composite displacement system is simple.

(2) The second dispersed particle gel preferably adopted by the present disclosure is a water-based dispersion system, has the characteristic of good compatibility with the displacement polymer/second surfactant/alkali, and can strengthen the mobility control capability and the oil displacement capability in the ternary polymer composite displacement process.

(3) The second dispersed particle gel particles preferably adopted by the present disclosure have good synergistic effect with the displacement polymer/second surfactant/alkali, the formed composite displacement system has higher interfacial activity, the oil-water interfacial tension can be reduced to the order of magnitude of $10^{-3}$ mN/m, and the mobility control and the oil displacement efficiency are significantly improved.

Hereunder the present disclosure will be described in detail below by way of examples.

This example illustrates the dispersed particle gel, composition and preparation method thereof and the method for oil displacement of the present disclosure.

The resin cross-linking agent is a phenolic resin prepolymer solution with 50 wt % effective quantity from Shengli Oilfield of Shengli Chemical Co., Ltd.

The resistance coefficient and the residual resistance coefficient in the water flooding stage are measured according to the industrial standard 'SYT 5862-93 performance measurement of acrylamide polymers for oil displacement'.

The viscosity of the dispersed particle gel-strengthened polymer ternary composite displacement system is determined according to the industrial standard 'SYT 5862-93 performance determination of acrylamide polymers for oil displacement'.

SEM images were examined using a JEOL JSM7600F scanning electron microscope.

The recovery efficiency of water flooding stage before the slug injection refers to the ratio of the oil quantity recovered in the water flooding stage to the original oil content, in %.

The recovery efficiency during the slug injection stage refers to the ratio of the oil quantity recovered in the composite displacement system injection stage to the original oil content, in %.

The recovery efficiency of the subsequent water flooding stage after the slug injection refers to the ratio of the oil quantity recovered in the subsequent water flooding stage to the original oil content, in %.

The enhanced crude oil recovery efficiency equals to the recovery efficiency of the subsequent water flooding stage after the slug injection minus the recovery efficiency of water flooding stage before the slug injection.

Preparation Example 1

(1) 0.6 g of polymeric matrix (partially hydrolyzed polyacrylamide with degree of hydrolysis of 5%, with weight-average molecular weight of 8,000,000 g/mol, purchased from Shandong Shida Oilfield Technical Services Co., Ltd.) was added into 97.9 g of water and stirred for 40 min to obtain a polymer solution; 0.9 g of resin cross-linking agent was added while stirring, and then the solution was further stirred for 5 min; then 0.5 g of sodium chloride coagulant was added while stirring, then the solution was further stirred for 5 min; finally 0.1 g of nano-graphite emulsion (nano-graphite emulsion purchased from Shanghai Chaowei Nanotechnology Co., Ltd., wherein, the particle size of nano-graphite is 100 nm, and the content of nano-graphite is 50 wt %) was added while stirring, and then the solution was further stirred for 10 min to a homogeneous state, thus a gelling fluid was obtained; then the gelling fluid was aged for gelation for 6 h at 85° C. in a thermostatic oven, to obtain a bulk gel system A1;

(2) The obtained bulk gel system A1 and water were loaded at 4:1 weight ratio into a colloid mill, and the mixture was sheared for 9 min at 3,000 rpm rotation speed at 25 μm shearing interval, and thereby a dispersed particle gel B1 was obtained, the particle size of the dispersed particle gel B1 is 1.2 μm.

Preparation Example 2

(1) 0.6 g of polymeric matrix (partially hydrolyzed polyacrylamide with degree of hydrolysis of 5%, with weight-average molecular weight of 8,000,000 g/mol, purchased from Shandong Shida Oilfield Technical Services Co., Ltd.) was added into 97.3 g of water and stirred for 40 min to obtain a polymer solution; 1.5 g of resin cross-linking agent was added while stirring, and then the solution was further stirred for 5 min; then 0.5 g of sodium chloride coagulant was added while stirring, then the solution was further stirred for 5 min; finally 0.1 g of nano-graphite emulsion (nano-graphite emulsion purchased from Shanghai Chaowei Nanotechnology Co., Ltd., wherein, the particle size of nano-graphite is 100 nm, and the content of nano-graphite is 50 wt %) was added while stirring, and then the solution was further stirred for 10 min to a homogeneous state, thus a gelling fluid was obtained; then the gelling fluid was aged for gelation for 4 h at 90° C. in a thermostatic oven, to obtain a bulk gel system A2;

(2) The obtained bulk gel system A2 and water were loaded at 4:1 weight ratio into a colloid mill, and the mixture was sheared for 12 min at 3,000 rpm rotation speed at 10 μm shearing interval, and thereby a dispersed particle gel B2 was obtained, the particle size of the dispersed particle gel B2 is 0.8 μm.

Example 1

(I) Preparing a Dispersed Particle Gel-Strengthened Polymer Ternary Composite Displacement System S1:

The formulation of this dispersed particle gel-strengthened polymer ternary composite displacement system S1 was as follows: 2 g of dispersed particle gel B1, 0.25 g of displacement polymer (a partially hydrolyzed polyacrylamide with degree of hydrolysis of 22%, with weight-average molecular weight of 16,000,000 g/mol, purchased from Shandong Nuoer Biological Technology Co., Ltd), 0.3 g of sodium heavy alkylbenzene sulfonate surfactant (purchased from Shengli Oilfield of Zhongsheng International Petrochemical Group Co., Ltd), 1.2 g of sodium hydroxide as the alkaline compound; and 96.25 g of water.

Figure 2:
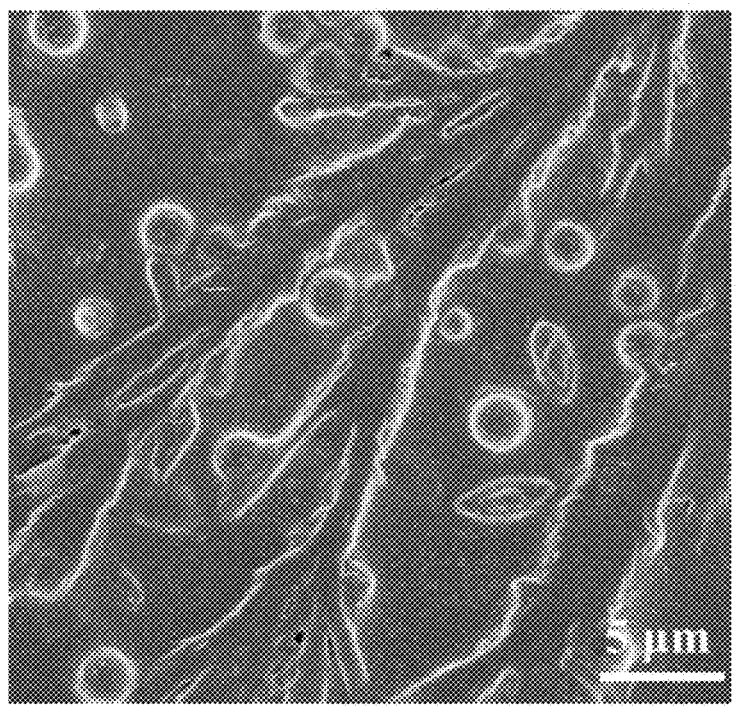
FIG. 2 is an SEM image of the dispersed particle gel-strengthened polymer ternary composite displacement system of example 1.

The preparation process comprised the following steps: adding the dispersed particle gel into water, and stirring for 5 minutes until the dispersed particle gel was fully dispersed; adding the displacement polymer while stirring, and stirring for 50 minutes until the displacement polymer was fully dissolved secondly, adding the alkaline compound, and stirring for 10 minutes until the alkaline compound was fully dissolved; and finally, adding the surfactant, and stirring for 10 minutes until the surfactant was fully dissolved, so that a dispersed particle gel-strengthened polymer ternary composite displacement system S1 with the viscosity of 38.6 mPa·s was obtained, and the SEM image of which is shown in FIG. 2.

(II) A Method for Oil Displacement Using Dispersed Particle Gel-Strengthened Polymer Ternary Composite Displacement System S1:

testing system:
simulated oil, viscosity of 10 mPa·s at 45° C.;
formation simulated water, degree of the mineralization is 5600 mg/L;
temperature: 45° C.;
basic parameters of the core: length×diameter=20 cm×2.5 cm, permeability of 0.5 μm$^2$, pore volume of 32 mL, and the prepared core was aged with saturated water and saturated oil in a thermostatic oven at 45° C. for 24 hours and water flooded to water content of 96%.

The slugs were then injected according to the following four slugs: a pre-treatment slug, a main slug, a protective slug and an over-propelling slug, and specifically comprised the following operations:

(1) injecting a pre-treatment slug into the formation, wherein the pre-treatment slug was 0.2 wt % of aqueous solution of sodium heavy alkylbenzene sulfonate surfactant, and the volume injection amount of which was 2% of the pore volume of the formation;

(2) injecting a main slug into the formation, wherein the main slug was a dispersed particle gel-strengthened polymer ternary composite displacement system S1, and the volume injection amount of which was 70% of the pore volume of the formation;

(3) injecting a protective slug into the formation, wherein the protective slug was 2 wt % of aqueous dispersion of dispersed particle gel B1, and the volume injection amount of which was 25% of the pore volume of the formation;

(4) injecting an over-propelling fluid into the formation, wherein the over-propelling fluid was water, and the volume injection amount of which was 3% of the pore volume of the formation;

After the four steps were completed, placing the core in a thermostatic oven at 45° C. for aging for 3 days, and then performing water flooding again until the water content reached 98%. The recovery efficiency of water flooding before the slug injection, the recovery efficiency during the slug injection stage and the recovery efficiency in the subsequent water flooding stage after the slug injection are shown in Table 1.

The resistance coefficients and residual resistance coefficients of the water flooding stage and the subsequent water flooding stage before and after the injection of the dispersed particle gel-strengthened polymer ternary composite displacement system were determined, and the results are shown in FIG. 1. It can be seen that after the injection of the dispersed particle gel-strengthened polymer ternary composite displacement system, the resistance coefficients and the residual resistance coefficients of the subsequent water flooding stage were obviously increased. After 5 times of the pore volume of water flooding, the residual resistance coefficients can still be kept high, which had a strong mobility control capability.

Example 2

(I) Preparing a Dispersed Particle Gel-Strengthened Polymer Ternary Composite Displacement System S2:

The formulation of this dispersed particle gel-strengthened polymer ternary composite displacement system S2 was as follows: 1.5 g of dispersed particle gel B2, 0.1 g of displacement polymer (a partially hydrolyzed polyacrylamide with degree of hydrolysis of 200%, with weight-average molecular weight of 15,000,000 g/mol, purchased from Shandong Nuoer Biological Technology Co., Ltd), 0.2 g of sodium heavy alkylbenzene sulfonate surfactant (purchased from Shengli Oilfield of Zhongsheng International Petrochemical Group Co., Ltd), 0.5 g of sodium bicarbonate as the alkaline compound; and 97.7 g of water.

The preparation process comprised the following steps: adding the dispersed particle gel into water, and stirring for 5 minutes until the dispersed particle gel was fully dispersed; adding the displacement polymer while stirring, and stirring for 40 minutes until the 1 displacement polymer was fully dissolved; secondly, adding the alkaline compound, and stirring for 10 minutes until the alkaline compound was fully dissolved; and finally, adding the surfactant, and stirring for 10 minutes until the surfactant was fully dissolved, so that a dispersed particle gel-strengthened polymer ternary composite displacement system S2 with the viscosity of 31.4 mPa·s was obtained.

(II) A Method for Oil Displacement Using Dispersed Particle Gel-Strengthened Polymer Ternary Composite Displacement System S2:

The method of step (II) of example 1 was carried out, except that:

in the step (2) of the slug injection, a dispersed particle gel-strengthened polymer ternary composite displacement system S2 was used in place of S1, and the volume injection amount of which was 75% of the pore volume of the formation;

in step (3) of the slug injection, 1.5 wt % of an aqueous dispersion of dispersed particle gel B2 was used in place of the aqueous dispersion of dispersed particle gel B1, and the volume injection amount of which was 20% of the pore volume of the formation.

Wherein, the recovery efficiency of water flooding before the slug injection, the recovery efficiency during the slug injection stage and the recovery efficiency in the subsequent water flooding stage after the slug injection are shown in Table 1.

Example 3

(I) Preparing a Dispersed Particle Gel-Strengthened Polymer Ternary Composite Displacement System S3:

The method of step (I) of example 1 was carried out, except that: the displacement polymer used in the formulation of the dispersed particle gel-strengthened polymer ternary composite displacement system was partially hydrolyzed polyacrylamide with degree of hydrolysis of 22%, with weight-average molecular weight of 12,000,000 g/mol, purchased from Shandong Nuoer Biological Technology Co., Ltd; thereby a dispersed particle gel-strengthened polymer ternary composite displacement system S3 with the viscosity of 28.4 mPa·s was obtained.

(II) A Method for Oil Displacement Using Dispersed Particle Gel-Strengthened Polymer Ternary Composite Displacement System S3:

The method of step (II) of example 1 was carried out, except that:

in the step (2) of the slug injection, a dispersed particle gel-strengthened polymer ternary composite displacement system S3 was used in place of S1;

Wherein, the recovery efficiency of water flooding before the slug injection, the recovery efficiency during the slug injection stage and the recovery efficiency in the subsequent water flooding stage after the slug injection are shown in Table 1.

Example 4

(I) Preparing a Dispersed Particle Gel-Strengthened Polymer Ternary Composite Displacement System S4:

The method of step (I) of example 1 was carried out, except that: the displacement polymer used in the formulation of the dispersed particle gel-strengthened polymer ternary composite displacement system was partially hydrolyzed polyacrylamide with degree of hydrolysis of 22%, with weight-average molecular weight of 20,000,000 g/mol, purchased from Shandong Nuoer Biological Technology Co., Ltd; thereby a dispersed particle gel-strengthened polymer ternary composite displacement system S4 with the viscosity of 46.8 mPa·s was obtained.

(II) A Method for Oil Displacement Using Dispersed Particle Gel-Strengthened Polymer Ternary Composite Displacement System S4:

The method of step (II) of example 1 was carried out, except that:

in the step (2) of the slug injection, a dispersed particle gel-strengthened polymer ternary composite displacement system S4 was used in place of S1;

Wherein, the recovery efficiency of water flooding before the slug injection, the recovery efficiency during the slug injection stage and the recovery efficiency in the subsequent water flooding stage after the slug injection are shown in Table 1.

Example 5

(I) Preparing a Dispersed Particle Gel-Strengthened Polymer Ternary Composite Displacement System S5:

The method of step (I) of example 1 was carried out, except that: the displacement polymer used in the formulation of the dispersed particle gel-strengthened polymer ternary composite displacement system was partially hydrolyzed polyacrylamide with degree of hydrolysis of 22%, with weight-average molecular weight of 22,000,000 g/mol, purchased from Shandong Nuoer Biological Technology Co., Ltd; thereby a dispersed particle gel-strengthened polymer ternary composite displacement system S5.

(II) A Method for Oil Displacement Using Dispersed Particle Gel-Strengthened Polymer Ternary Composite Displacement System S5:

The method of step (II) of example 1 was carried out, except that:

in the step (2) of the slug injection, a dispersed particle gel-strengthened polymer ternary composite displacement system S5 was used in place of S1;

Wherein, the recovery efficiency of water flooding before the slug injection, the recovery efficiency during the slug injection stage and the recovery efficiency in the subsequent water flooding stage after the slug injection are shown in Table 1.

Example 6

(I) Preparing a Dispersed Particle Gel-Strengthened Polymer Ternary Composite Displacement System S6:

The method of step (I) of example 1 was carried out, except that: in the formulation of the dispersed particle gel-strengthened polymer ternary composite displacement system, equal parts by weight of sodium hexadecylsulfonate was used in place of sodium heavy alkylbenzene sulfonate, thereby a dispersed particle gel-strengthened polymer ternary composite displacement system S6 with the viscosity of 38.5 mPa·s was obtained.

(II) A Method for Oil Displacement Using Dispersed Particle Gel-Strengthened Polymer Ternary Composite Displacement System S6:

The method of step (II) of example 1 was carried out, except that:

in the step (1) of the slug injection, 0.2 wt % the aqueous solution of sodium hexadecylsulfonate surfactant was used in place of the aqueous solution of sodium heavy alkylbenzene sulfonate;

in the step (2) of the slug injection, a dispersed particle gel-strengthened polymer ternary composite displacement system S6 was used in place of S1;

Wherein, the recovery efficiency of water flooding before the slug injection, the recovery efficiency during the slug injection stage and the recovery efficiency in the subsequent water flooding stage after the slug injection are shown in Table 1.

Example 7

(I) Preparing a Dispersed Particle Gel-Strengthened Polymer Ternary Composite Displacement System S7:

The method of step (I) of example 1 was carried out, except that: in the formulation of the dispersed particle gel-strengthened polymer ternary composite displacement system, equal parts by weight of dispersed particle gel B7 (with a particle size of 1.2 μm, purchased from Dongying Hehui Petroleum Technology Co., Ltd) was used in place of dispersed particle gel B1, thereby a dispersed particle gel-strengthened polymer ternary composite displacement system S7 with the viscosity of 33.6 mPa·s was obtained.

(II) A Method for Oil Displacement Using Dispersed Particle Gel-Strengthened Polymer Ternary Composite Displacement System S7:

The method of step (II) of example 1 was carried out, except that:

in the step (2) of the slug injection, a dispersed particle gel-strengthened polymer ternary composite displacement system S7 was used in place of S1; in the step (3) of the slug injection, the aqueous dispersion of dispersed particle gel B7 of step (I) of example 7 (with a particle size of 1.2 μm, purchased from Dongying Hehui Petroleum Technology Co., Ltd) was used in an equal mass concentration in place of the aqueous dispersion of dispersed particle gel B1;

Wherein, the recovery efficiency of water flooding before the slug injection, the recovery efficiency during the slug injection stage and the recovery efficiency in the subsequent water flooding stage after the slug injection are shown in Table 1.

Comparative Example 1

Figure 3:
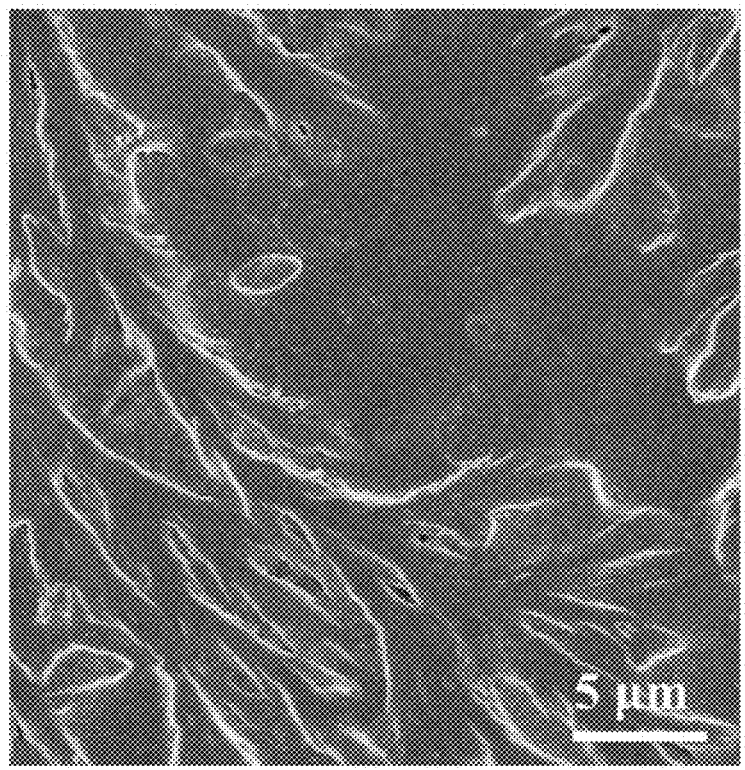
FIG. 3 is an SEM image of the dispersed particle gel-strengthened polymer ternary composite displacement system of comparative example 1.

(I) Preparing a Comparative Polymer Ternary Composite Displacement System DS1:

The method of step (I) of example 1 was carried out, except that the dispersed particle gel B1 was not used and the amount of water used was adjusted to 98.25 g, thereby a comparative polymer ternary composite displacement system DS1 was obtained, and the SEM image of which is shown in FIG. 3.

(II) A Method for Oil Displacement Using Comparative Polymer Ternary Composite Displacement System DS1:

The method of step (II) of example 1 was carried out, except that:

in the step (2) of the slug injection, a comparative polymer ternary composite displacement system DS1 was used in place of S1;

in the step (3) of the slug injection, the protective slug was instead a displacement polymer with a mass fraction of 0.25 wt % (the displacement polymer was a partially hydrolyzed polyacrylamide with degree of hydrolysis of 22%, with weight-average molecular weight of 16,000,000 g/mol, purchased from Shandong Nuoer Biological Technology Co., Ltd) in place of the aqueous solution of dispersed particle gel B1.

The recovery efficiency of water flooding before the slug injection, the recovery efficiency during the slug injection stage and the recovery efficiency in the subsequent water flooding stage after the slug injection are shown in Table 1.

The resistance coefficients and residual resistance coefficients of the water flooding stage and the subsequent water flooding stage before and after the injection of the polymer ternary composite displacement system were determined, and the results are shown in FIG. 1. It can be seen that the pressure of the stage of the injection of the polymer ternary composite displacement system is increased, but after 4 times of the pore volume of water flooding, the pressure of the subsequent water flooding stage is obviously reduced, which shows that the mobility control of the polymer ternary composite displacement system is mainly focused on the stage of the injection of the composite displacement system, and the subsequent mobility control is weaker.

Comparative Example 2

(I) Preparing a Comparative Polymer Ternary Composite Displacement System DS2:

The method of step (I) of example 1 was carried out, except that the displacement polymer used was a partially hydrolyzed polyacrylamide with degree of hydrolysis of 22%, with weight-average molecular weight of 9,000,000 g/mol, purchased from Shandong Nuoer Biological Technology Co., Ltd, thereby a comparative polymer ternary composite displacement system DS2 was obtained.

(II) A Method for Oil Displacement Using Comparative Polymer Ternary Composite Displacement System DS2:

The method of step (II) of example 1 was carried out, except that:

in the step (2) of the slug injection, a comparative polymer ternary composite displacement system DS2 was used in place of S1;

The recovery efficiency of water flooding before the slug injection, the recovery efficiency during the slug injection stage and the recovery efficiency in the subsequent water flooding stage after the slug injection are shown in Table 1.

TABLE 1

| No. | recovery efficiency of early water flooding | recovery efficiency during the slug injection stage | recovery efficiency of the subsequent water flooding | enhanced recovery efficiency |
|---|---|---|---|---|
| Example 1 | 45.2% | 53.3% | 74.8% | 29.6% |
| Example 2 | 46.1% | 54.4% | 68.7% | 22.4% |
| Example 3 | 45.3% | 51.1% | 61.4% | 16.1% |
| Example 4 | 45.7% | 56.2% | 64.5% | 18.8% |
| Example 5 | 45.3% | 54.7% | 61.2% | 15.9% |
| Example 6 | 46.2% | 52.3% | 62.6% | 16.4% |
| Example 7 | 45.4% | 50.1% | 63.4% | 17.0% |
| Comparative example 1 | 45.6% | 53.4% | 57.4% | 11.8% |
| Comparative example 2 | 45.1% | 52.8% | 59.9% | 14.8% |

As can be seen from the Table 1, the dispersed particle gel-strengthened polymer ternary composite displacement system adopted by the method for oil displacement according to the present disclosure has good viscosity-increasing synergistic effect and high subsequent mobility control, so that the water flooding recovery efficiency is effectively improved.

While the present disclosure is described above in detail in some preferred embodiments, the present disclosure is not limited to those embodiments. Various simple variations, including combinations of the technical features in any other appropriate way, can be made to the technical scheme of the present disclosure within the scope of the technical concept of the present disclosure, but such variations and combinations shall be deemed as disclosed content in the present disclosure and falling in the protection scope of the present disclosure.

The invention claimed is:

1. A method for oil displacement, comprising: through the water well of an oil field,
   (1) injecting a pre-treatment slug into the formation, wherein the pre-treatment slug comprises a first surfactant;
   (2) injecting a main slug into the formation, wherein the main slug comprises a dispersed particle gel-strengthened polymer ternary composite displacement system, the dispersed particle gel-strengthened polymer ternary composite displacement system contains a second dispersed particle gel, an oil displacement polymer, an alkaline compound, and a second surfactant, and the oil displacement polymer is a first partially hydrolyzed polyacrylamide with weight-average molecular weight of 10,000,000 to 25,000,000;
   (3) injecting a protective slug into the formation, wherein the protective slug comprises a first dispersed particle gel; and
   (4) injecting an over-propelling fluid into the formation
   wherein the first dispersed particle gel and the second dispersed particle gel are the same or different and are each prepared from a composition for dispersed particle gel by a process comprising: (1) providing a gelling fluid containing the composition for dispersed particle gel and water, and then aging for gelation to obtain a bulk gel system; and (2) shearing the resulting bulk gel system together with water to obtain the first dispersed particle gel or the second dispersed particle gel.

2. The method of claim 1, wherein the volume injection amount of the pre-treatment slug is 1 to 5% of the pore volume of the formation;
   the volume injection amount of the main slug is 65 to 88% of the pore volume of the formation;
   the volume injection amount of the protective slug is 10 to 25% of the pore volume of the formation;
   the volume injection amount of the over-propelling fluid is 1 to 5% of the pore volume of the formation.

3. The method of claim 1, further comprising: after the steps (1) to (4) are completed, closing the water well and oil well of the oil field for 3 to 5 days, and then opening the water well and oil well to recover the production.

4. The method of claim 1, wherein the content of the second dispersed particle gel is 0.2 to 8 wt %, the content of the oil displacement polymer is 0.1 to 2 wt %, the content of the alkaline compound is 0.1 to 5 wt %, and the content of the second surfactant is 0.1 to 1.5 wt %, based on the total weight of the dispersed particle gel-strengthened polymer ternary composite displacement system.

5. The method of claim 1, wherein the content of the second dispersed particle gel is 1 to 3 wt %, the content of the oil displacement polymer is 0.2 to 0.3 wt %, the content of the alkaline compound is 0.5 to 1.2 wt %, and the content of the second surfactant is 0.2 to 0.4 wt %, based on the total weight of the dispersed particle gel-strengthened polymer ternary composite displacement system.

6. The method of claim 1, wherein the weight-average molecular weight of the first partially hydrolyzed polyacrylamide is 15,000,000 to 17,000,000 g/mol.

7. The method of claim 1, wherein a degree of hydrolysis of the first partially hydrolyzed polyacrylamide is 14 to 24%.

8. The method according to claim 1, wherein the first dispersed particle gel and the second dispersed particle gel are the same or different and have a particle size of 0.5 to 10 µm.

9. The method according to claim 1, wherein the contains a polymeric matrix, a resin cross-linking agent, a coagulant, and nano-graphite emulsion, wherein:
with respect to 100 parts by weight of the polymeric matrix, a content of the resin cross-linking agent is 30 to 150 parts by weight, a content of the coagulant is 5 to 100 parts by weight, and a content of the nano-graphite emulsion is 3 to 30 parts by weight;
wherein, the polymeric matrix is a second partially hydrolyzed polyacrylamide with weight-average molecular weight within a range of 5,000,000 to 8,000,000 g/mol;
the coagulant is one or more of chloride salt coagulant and alcohol amine coagulant.

10. The method of claim 9, wherein with respect to 100 parts by weight the polymeric matrix, the content of the resin cross-linking agent is 50 to 100 parts by weight, the content of the coagulant is 8 to 50 parts by weight, and the content of the nano-graphite emulsion is 4 to 18 parts by weight.

11. The method of claim 9, wherein the weight-average molecular weight of the polymeric matrix is 6,000,000 to 8,000,000 g/mol.

12. The method of claim 9, wherein a degree of hydrolysis of the second partially hydrolyzed polyacrylamide is 3 to 6%.

13. The method of claim 9, wherein the resin cross-linking agent is a phenolic resin prepolymer.

14. The method of claim 9, wherein particle size of nano-graphite in the nano-graphite emulsion is 50 to 100 nm;
the content of nano-graphite in the nano-graphite emulsion is 30 to 70 wt %.

15. The method of claim 9, wherein the chloride salt coagulant is one or more of sodium chloride, potassium chloride, and calcium chloride.

16. The method of claim 9, wherein the alcohol amine coagulant is one or more of tri-ethanolamine, tri-iso-propanolamine, and tri-iso-butanolamine.

17. The method of claim 1, wherein the alkaline compound is one or more of sodium hydroxide, potassium hydroxide, sodium carbonate, sodium bicarbonate, potassium carbonate, sodium silicate, and ammonia.

18. The method of claim 1, wherein the first surfactant and the second surfactant are the same or different and are each selected from one or more of an alkylbenzene sulfonate, an alkyl sulfonate, a petroleum sulfonate, and a petroleum carboxylate.

* * * * *